(12) United States Patent
Berkman et al.

(10) Patent No.: US 12,487,987 B2
(45) Date of Patent: Dec. 2, 2025

(54) AUTOMATED DATA AUTHENTICITY VALIDATION

(71) Applicant: Own Data Company Ltd, Tel Aviv (IL)

(72) Inventors: Ariel Berkman, Herzliya (IL); Eoghan Casey, Baltimore, MD (US)

(73) Assignee: Salesforce, Inc., San Francisco, CA (US)

( * ) Notice: Subject to any disclaimer, the term of this patent is extended or adjusted under 35 U.S.C. 154(b) by 51 days.

(21) Appl. No.: 18/498,881

(22) Filed: Oct. 31, 2023

(65) Prior Publication Data

US 2025/0139078 A1     May 1, 2025

(51) Int. Cl.
*G06F 17/00*     (2019.01)
*G06F 16/23*     (2019.01)
*G06F 21/60*     (2013.01)
*G06F 21/64*     (2013.01)

(52) U.S. Cl.
CPC ........ *G06F 16/2365* (2019.01); *G06F 21/602* (2013.01); *G06F 21/64* (2013.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| | | | | |
|---|---|---|---|---|
| 7,296,180 B1 * | 11/2007 | Waterhouse | ........ | G06F 11/1662 714/2 |
| 8,566,680 B1 * | 10/2013 | Cousins | ............ | H03M 13/1515 714/781 |
| 9,998,150 B1 * | 6/2018 | Lazier | ................... | G06F 1/3268 |
| 10,558,581 B1 * | 2/2020 | Lazier | ................ | G06F 21/6218 |
| 12,130,836 B1 * | 10/2024 | Restivo | .................... | G06F 16/27 |
| 2003/0035548 A1 * | 2/2003 | Kwan | ..................... | H04L 63/04 713/155 |

(Continued)

OTHER PUBLICATIONS

Github.com [online], "Case-Implementation-PROV-O," 2021, retrieved on Dec. 6, 2023, retrieved from URL<https://github.com/casework/CASE-Implementation-PROV-O>, 13 pages.

(Continued)

*Primary Examiner* — Hung D Le

(57) ABSTRACT

Methods, systems, and apparatus, including computer programs encoded on computer storage media, for validating data authenticity. One of the methods includes retrieving data that includes (i) an archived version of a data source, (ii) a first hash value, and (iii) a set of provenance data for the archived version of the data source; hashing the archived version of the data source to generate a second hash value; determining that the second hash value and the first hash value satisfy a similarity criterion; detecting one or more differences between archived data in the archived version of the data source and current data in a current version of the data source; determining, using the set of provenance data, whether the archived version of the data source is likely authentic; and in response, restoring one or more portions of the data source corresponding to some of the one or more differences.

20 Claims, 2 Drawing Sheets

(56) References Cited

U.S. PATENT DOCUMENTS

| | | | | |
|---|---|---|---|---|
| 2010/0017615 A1* | 1/2010 | Boesgaard | ............ | G06F 21/606 |
| | | | | 713/176 |
| 2012/0310890 A1* | 12/2012 | Dodd | ................. | G06F 11/1451 |
| | | | | 707/646 |
| 2016/0378772 A1* | 12/2016 | Hostetter | .............. | G06F 16/113 |
| | | | | 707/667 |
| 2019/0227877 A1* | 7/2019 | Pandey | ................. | G06F 16/128 |
| 2021/0216413 A1* | 7/2021 | Saad | ................... | G06F 11/1464 |
| 2022/0066983 A1* | 3/2022 | Paschke | .............. | G06F 16/2282 |
| 2022/0109603 A1* | 4/2022 | Ramasamy | ............ | H04L 47/783 |
| 2022/0158855 A1* | 5/2022 | Wentz | ................... | H04L 9/3247 |
| 2022/0255737 A1* | 8/2022 | Ebrahimi | .............. | H04L 9/3234 |
| 2024/0419496 A1* | 12/2024 | Bhattacharjee | ....... | G06F 1/3296 |

OTHER PUBLICATIONS

Owndata.com [online], "How to capture forensic-quality copies of SAAS data," Nov. 9, 2022, retrieved on Dec. 6, 2023, retrieved from URL<https://www.owndata.com/blog/how-to-capture-forensic-quality-copies-of-saas-data>, 11 pages.

* cited by examiner

AUTOMATED DATA AUTHENTICITY VALIDATION

BACKGROUND

Various systems can create backups of the data stored on the system. For instance, a system that includes a database can backup data from the database. Similarly, a system that includes digital files can backup information from the system. This can include storing data from the database on multiple memories.

SUMMARY

An authentication system can create copies of important information for later retrieval in case of data loss events, including destruction, corruption, malicious encryption, accidental deletion, or a combination of these. These copies, referred to as backups, can be stored separately from the original information to increase a likelihood that the backup is available in case of a data loss event to the original data. Backups can serve as a means to restore information to its previous state. Use of the phrase information generally refers to data and corresponding metadata. Unless otherwise indicated, reference to data can include the corresponding metadata.

Data recovery can refer to the process of retrieving and reconstituting backed-up information to its original state, e.g., after a data loss event. Validating the authenticity of recovered information can include determining, e.g., and in some instances showing, that the information came from the expected source of the information and that the recovered data and metadata are likely a complete and accurate representation of the original information.

The authentication system can use provenance data to support automated determinations of authenticity of the recovered information, reduce a likelihood that potentially corrupted information is retrieved from an archive, or both. When the information is determined to likely be authentic, the authentication system can use the retrieved information as part of a restoration process. When the information is determined to not likely be authentic, the authentication system can skip use of the information during a restoration process. The authentication system can retrieve other information, e.g., for the restoration process, present a notification about the authenticity, or a combination of both. As a result, the authentication system can use provenance details to validate authenticity of the retrieved information.

In general, one aspect of the subject matter described in this specification can be embodied in methods that include the actions of retrieving, from an archival database, data that includes (i) an archived version of a data source, (ii) a first hash value, and (iii) a set of provenance data for the archived version of the data source; hashing the archived version of the data source to generate a second hash value; determining that the second hash value and the first hash value satisfy a similarity criterion; detecting one or more differences between archived data in the archived version of the data source and current data in a current version of the data source; determining, using the set of provenance data for the archived version of the data source, whether the archived version of the data source is likely authentic; and in response to determining that the second hash value and the first hash value satisfy the similarity criterion and that the archived version of the data source is likely authentic using the set of provenance data, restoring, from the archived version of the data source, one or more portions of the data source corresponding to some of the one or more differences.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations, the provenance data represents one or more of (i) a source of the archived version of the data source, (ii) an operation performed on the archived version of the data source, (iii) a tool used to perform the operation on the archived version of the data source, or (iv) an indication of a result of the operation.

In some implementations, determining, using the set of provenance data, whether the archived version of the data source is likely authentic includes: comparing an expected number of operations and results with a number of operations and results represented in the provenance data. In some implementations, determining, using the set of provenance data, whether the archived version of the data source is likely authentic includes: comparing an expected result of one or more operations with one or more results represented in the provenance data. In some implementations, the expected result of one or more operations is a result indicating operation success of the one or more operations, where the one or more operations are performed on the archived version of the data source.

In some implementations, restoring the one or more portions of the data source includes: restoring one or more data objects used to detect the one or more differences between archived data in the archived version of the data source and current data in the current version of the data source.

In some implementations, actions include determining that a portion of the current version of the data source is likely corrupted or has been lost, where: retrieving the archived version and detecting the one or more differences between the archived data in the archived version of the data source and the current data in the current version of the data source are responsive to determining that the portion of the current version of the data source is likely corrupted or has been lost.

The subject matter described in this specification can be implemented in various implementations and may result in one or more of the following advantages. By maintaining provenance details, the techniques described can provide authenticity improvements for recovery and reconstitution of the original information. Information sources, e.g., database systems, a live or current database, can be modified either by bad actors or processing malfunctions to include different information than that which was stored at a previous time. Techniques described can identify portions of stored information that have been modified and allow for recovery or reconstitution of modified data portions to a previously stored state—e.g., before one or more modifications. In some implementations, the techniques and systems described in this specification can be used to enable automated authentication that was previously not possible by prior systems or manually, e.g., manual review of information for a backup is generally difficult if not impossible given the number of data objects in a backup, the number of operations performed as part of a backup process, or both. For instance, an authentication process can use provenance data generated for each of multiple steps, e.g., all steps, in a backup process to improve the accuracy of the authentication analysis or reconstitution. In some implementations, techniques include automatically detecting problems in a recovery or reconstitution process which detection was not available in other systems, e.g., at all or as accurately.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
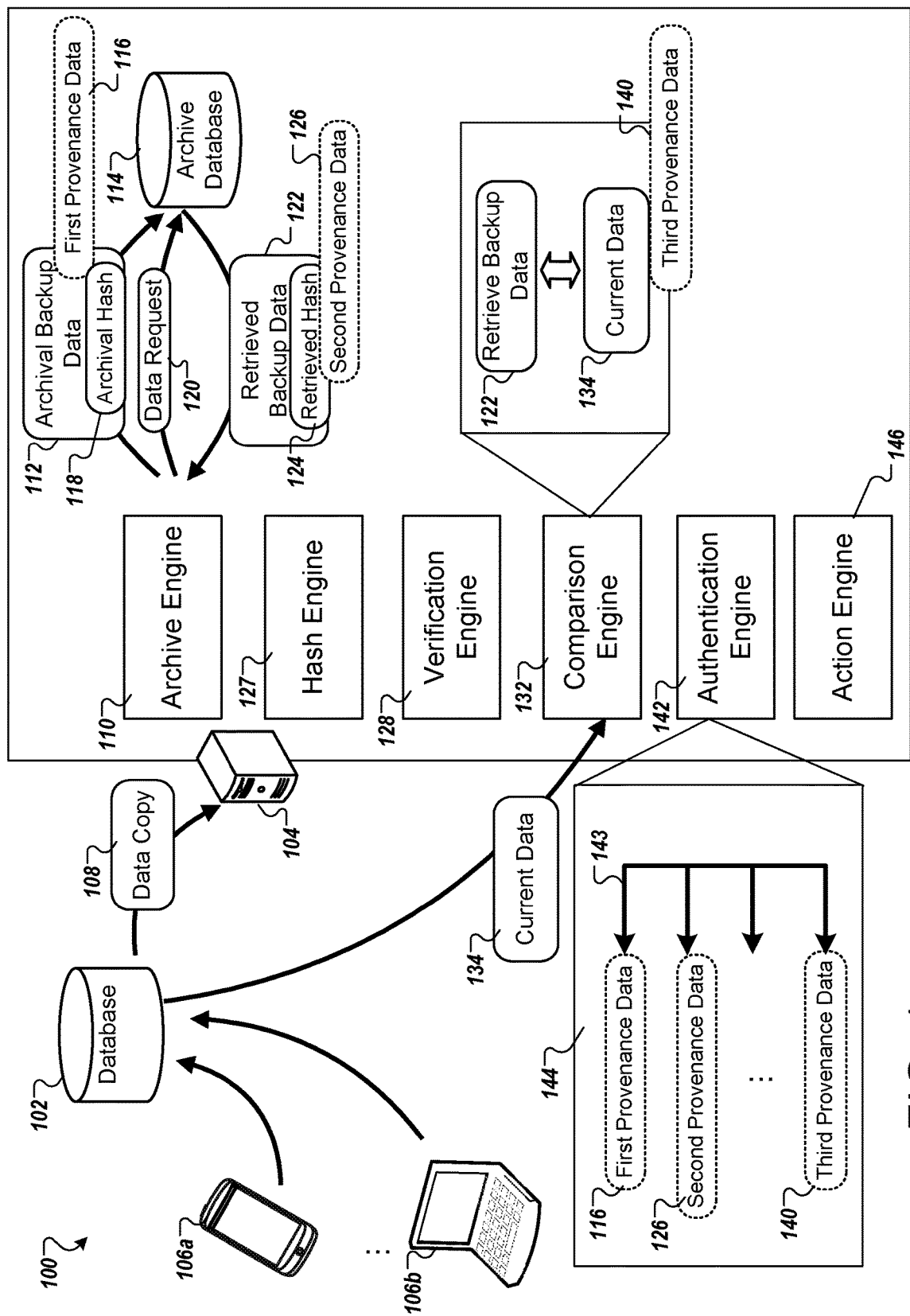
FIG. 1 depicts an example environment that includes a system for data authentication validation.

FIG. 1 depicts an example environment 100 that includes an authentication system 104 for automated authenticity validation of information. The information can be recovered information, information being analyzed for recovery, or any other appropriate type of information. In general, the authentication system 104 can backup data from an information source, such as database 102, and create provenance data showing the provenance of the backup data. Such provenance data can be used to authenticate the backup data for later use when restoring backup data, in analysis, such as analysis for legal purposes, or both. The authentication system 104 can determine, e.g., using the provenance data, whether or not the backup data is authentic. If the authentication system 104 affirmatively validates the authenticity of the backup, e.g., determines that the data is likely authentic, the authentication system 104 can determine that portions of the backup impacted by a data loss event can be recovered from the backup to restore a complete backup, or a portion of backup. Information at a source or included in backup data for which provenance data is generated can generally include any form of information (e.g., data, metadata, or both, generally referred to either as information or data).

In this specification, with respect to information, data loss includes destruction, corruption, malicious encryption, accidental deletion, or a combination of these, of the information. For instance, a computer system can lose information due to a storage device failure. Data recovery includes retrieving or reconstituting information impacted by a data loss event.

The database 102 can be any appropriate information source. For instance, the database 102 stores data accessible by one or more devices—e.g., devices 106a-b. Users or programs using the devices 106a-b can modify data stored in the database 102. In some implementations, the database 102 is stored in the cloud.

The authentication system 104 obtains a data copy 108 from the database 102, e.g., via a network. The data copy 108 can include one or more data objects stored in the database 102. The data copy 108 can include all data objects stored in the database 102 or a portion of the data objects stored in the database 102. The data copy 108 can include metadata stored in the database 102.

An archive engine 110 of the authentication system 104 can store archival backup data 112 in an archive database 114. The archive engine 110 can use, as the archival backup data 112, a subset of the data copy 108 or to include all data objects of the data copy 108.

In some implementations, the archive engine 110 generates archival backups periodically over time. For example, the archive engine 110 can generate a partial or complete backup of data stored in the database 102 every day or week, among other time increments. In some implementations, the archive engine 110 is configured to generate backups when data in the database 102 changes. For example, the archive engine 110 can monitor the database 102 for changes. Upon detection of one or more changes or a threshold quantity of changes, the archive engine 110 can generate a partial or complete backup of data stored in the database 102 or data detected to have changed in the database 102.

The authentication system 104 generates first provenance data 116 about the archival backup data 112. The first provenance data 116 can be stored in the archive database 114 or another database, e.g., when different backups are stored in different databases or combinations of databases. The first provenance data 116 can be uniquely linked to the archival backup data 112. For instance, each backup generated and stored by the archive engine 110 can have corresponding provenance data indicating details of the archival process. Some examples of provenance data include which user account made a backup, which tool for a backup process was used, a time of the backup, an environment for the backup, a location of a source used to create the archived version, when the backup was made, size, a number of data objects, e.g., in the database 102 or the archival backup data 112, an origin database, e.g., an identifier for the database 102, a unique identifier associated with the corresponding backup, such as a hash value or other unique value, or a combination of two or more of these. Provenance data can be used to keep track of operations performed on data and results, e.g., what operations were performed on archive data and whether operations completed successfully or not.

The authentication system 104 generates an archival hash 118 of the archival backup data 112. For example, the authentication system 104 can operate one or more hash functions. The authentication system 104 can provide one or more portions of the archival backup data 112, or the computer archival backup data 112, to the one or more hash functions. The authentication system 104 can use output from the one or more hash functions as the archival hash 118. In some implementations, the authentication system 104 stores the archival hash 118 with the archival backup data 112. For example, the archive engine 110 can store the archival hash 118 with the archival backup data 112 in the archive database 114—e.g., in a data object where the archival hash 118 is associated with the archival backup data 112, such as a dictionary or hash table, among others.

The authentication system 104 can store generated hash values in any appropriate location. For example, the authentication system 104 can store the archival hash 118 in a centralized repository other than the archive database 114.

The authentication system 104 can include the archival hash 118 in the first provenance data 116. For example, the first provenance data 116 can include a field indicating the archival hash 118, a successful generation of the archival hash 118, an unsuccessful generation of the archival hash 118, a storage location of the archival hash 118 or the archival backup data 112, or other data representing the archival hash 118 or indicating a result of a hash generation process used to generate the archival hash 118.

In the example of FIG. 1, the authentication system 104 determines to retrieve data from the archive database 114. For instance, the authentication system 104 can receive a request, e.g., from one of the devices 106a-b, for archived data, e.g., that might not specify the database in which the archived data is stored. The request can indicate an original source for which the request is requesting archived data, e.g., can identify the database 102. In some examples, the authentication system 104 can determine that some data in the original source might be corrupted or missing and, in response, determine to retrieve data from the archive database 114.

In response to the authentication system 104 determining to retrieve data from the first archive database, the archive engine 110, or another component of the authentication system 104, generates and provides a data request 120 to the archive database 114. The data request identifies the archival backup data 112—e.g., by a unique identifier assigned to the archival backup data 112. In some implementations, the archive engine 110 generates a unique identifier for the archival backup data 112, e.g., when storing the archival backup data 112 in the archive database 114, and uses the unique identifier to query the archive database 114. In some implementations, the unique identifier is a copy of the archival hash 118 or other data to be used as an identifier to retrieve the archival backup data 112.

The authentication system 104 can determine the backup to request using any appropriate process. For instance, the authentication system 104 can determine that the archival backup data 112 is the most recent backup of data in the database 102, is the backup that is most likely to have a prior version of data for the database 102, e.g., the data that was corrupted or lost, or another appropriate process.

The archive engine 110 retrieves the stored backup data, e.g., as retrieved backup data 122, from the archive database 114. The archive engine 110 can use any appropriate process to retrieve the stored backup data, e.g., by receiving the retrieved backup data 122 from the archive database 114 using a network.

In some implementations, the archive engine 110 retrieves a stored hash, e.g., a retrieved hash 124, from the archive database 114—e.g., when the archive database 114 is used to store the archival hash 118. In some implementations, the archive engine 110 obtains the retrieved hash 124 from another database. In some implementations, the archive engine 110 stores a copy of the archival hash 118 or other data to be used as an identifier to retrieve the archival backup data 112 and accesses the stored archival hash 118 as the identifier to request the archival backup data 112, received as the retrieved backup data 122. In these implementations, the archive engine 110 can use the stored copy of the archival hash 118 as the retrieved hash 124.

The archive engine 110 accesses second provenance data 126 corresponding to the archival backup data 112 and the retrieved backup data 122. The second provenance data 126 can be the same as the first provenance data 116 stored by the archive engine 110. The second provenance data 126 can be different than the first provenance data 116 stored. For example, the second provenance data 126 can include an indication of one or more operations performed on data of the archival backup data 112, e.g., operations of storing the archival backup data 112 on, or retrieving the retrieved backup data 122 from, or both, the archive database 114. When the second provenance data 126 is different from the first provenance data 116, the second provenance data 126 can include the first provenance data 116 and additional data generated for operations performed on the archival backup data 112, e.g., during the retrieval process to get the retrieved backup data 122.

A hash engine 127, included in the authentication system 104, computes a hash for and using the retrieved backup data 122. In general, the authentication system 104 can generate provenance data for each of one or more operations, e.g., all operations, involving a data archival process, a data retrieval process, or both, e.g., for the storage of the archival backup data 112 in the archive database 114 and later retrieval as the retrieved backup data 122. Data in provenance datasets can indicate relationships, e.g., link, between multiple sets of provenance data, e.g., the first provenance data 116, the second provenance data 126, among others based on other operations. The authentication system 104 can use the data indicating the relationships to generate a superset, e.g., a record, of provenance for backups obtained from data stored on the database 102. An authentication engine 142 can process the provenance data or linking of provenance data indicating relationships or process flows to determine authenticity.

Provenance data can include an indication that an operation, e.g., generating a hash using data of the retrieved backup data 122 as input, was successful or not successful—e.g., satisfied one or more process result criteria, executed all processing code without raising errors, or a combination of these.

The authentication system 104 can verify the integrity of backup data 122. For instance, a verification engine 128 compares the retrieved hash 124 and the hash computed by the hash engine 127 using the retrieved backup data 122. The verification engine 128 determines whether the retrieved hash 124 and the computed hash satisfy a similarity criterion, e.g., match or are sufficiently similar—e.g., when hash functions used to generate the archival hash 118 and the retrieved hash 124 use a form of locality sensitive hashing. If the retrieved hash 124 and the recomputed hash satisfy the similarity criterion, the authentication system 104 can determine to continue processing the retrieved backup data 122.

If the verification engine 128 determines that the retrieved hash 124 and the computed hash do not satisfy the similarity condition, the authentication system 104 can request and obtain one or more prior backups, e.g., from the archive database 114. The one or more prior backups can be earlier in time, e.g., sequentially, from the time when the archival backup data 112 was made. As a result, the authentication system 104 can repeat one or more of the above-described steps until the authentication system 104 retrieves backup data for which the verification engine 128 determines that a retrieved hash 124 and a computed hash satisfy the similarity criterion.

In some implementations, the verification engine 128 generates verification provenance data. The verification provenance data can include other provenance data generated—e.g., first provenance data 116 or second provenance data 126—or be added to other provenance data to generate a set of provenance data. The verification provenance data can include an indication that the retrieved hash 124 was compared with the recomputed hash, e.g., an indication of one or more operations included in a comparison process and a result of the one or more operations. The verification provenance data can include an indication of a result of the comparison—e.g., whether or not the retrieved hash 124 and the recomputed hash satisfy a similarity criterion.

A comparison engine 132 compares current data 134 with the retrieved backup data 122, e.g., using any appropriate process such as using the actual data for both datasets, metadata for both datasets, or a combination of both. The comparison engine 132 can obtain the current data 134 from the database 102 or an archive database, e.g., the archive database 114, where the current data 134 is a most recent data backup obtained from the database 102. In some examples, the comparison engine 132 can perform the comparison at the file, object, record, or field level. The comparison engine 132 can detect any differences between the retrieved backup data 122 and the current data 134—e.g., changes in metadata, schema, fields, data objects, among others.

As part of the comparison process, the comparison engine 132 can generate third provenance data 140. The third provenance data 140 can include an indication that the comparison engine 132 compared the retrieved backup data 122 and the current data 134, a result of the comparison, among other indications of operations performed, data for those operations, or both. As mentioned in reference to other provenance data, the third provenance data 140 can be combined with one or more other provenance data or be stored together to generate a provenance data set which can be used as a record for authenticity determinations.

In general, the provenance data 144 can include any appropriate data that can be used to verify the authenticity of the data to which it corresponds. Here, the provenance data 144 includes one or more portions of previously generated provenance data—e.g., first provenance data 116, second provenance data 126, and third provenance data 140. In some examples, the group of different sets of provenance data 144 can be referred to as a record.

For instance, the provenance data 144 can include details of each operation performed with or on data of the retrieved backup data 122. In some implementations, data in the provenance data 144 can represent links, e.g., links 143, that connect one or more items of provenance data to create a provenance record for a given item of backup data. The links can indicate a process flow representing a chronological order of operations performed on backup data.

One example of data for which the authentication system 104 can generate provenance data is data that is being backed up as part of an archival process. For this archival process, the first provenance data 116 can identify a source of the archival backup data 112, e.g., the database 102. The first provenance data 116 can identify an operation performed on that source data, e.g., that the operation performed on the archival backup data 112 was being stored in the archive database 114.

In some examples, the authentication system 104 can generate provenance data as part of a data retrieval process. For this retrieval process, the second provenance data 126 can include an indication that the source of the retrieved backup data 122 is the archive database 114. Since the first provenance data 116 is stored in the archive database 114 with the backup data 122, the second provenance data 126 can indicate a link back to the first provenance data 116. The second provenance data 126 can indicate that the operation performed on the backup data 122 was retrieved from the archive database 114. As a result, the links can represent a connection between provenance data—e.g., from a first operation of the first provenance data 116 to a second operation of the second provenance data 126.

The authentication system 104 can generate provenance data 144 for any appropriate operation or combination of operations. For instance, if multiple operations are performed in sequence, the authentication system 104 can generate provenance data that indicates multiple operations with internal references or links between the multiple operations. The multiple operations can be linked with multiple, or single, operations of other provenance data to create a linked set of operations indicating a provenance record of backup data. In some implementations, the authentication system 104 can add links iteratively as provenance data is generated—e.g., the authentication system 104 adds one or more links that connect operation representations of the first provenance data 116 with operation representations of the second provenance data 126.

In some implementations, connections, e.g., represented by the links 143, between operations in a data analysis process are numerous or complex. For example, archived data, or data to be archived, might be processed in multiple ways—e.g., tens, hundreds, or thousands of times—each of which can create an operation record. Links or relationships can include various types of data, e.g., provenance record identifiers, date or time or both, performer, references to input information sources, output results, processing applied to data, or a combination of one or more of these. Manual checking such connections to improve authenticity is not feasible and can create errors—e.g., resulting in authentic data being identified as inauthentic or vice versa. In addition, manual determination can be limited by availability of experts to analyze the data, can be impossible given the number or types of connections, or a combination of both. In contrast, the provenance data records, e.g., provenance data 144, enable automatic authentication analysis that would not be possible for other systems that do not have provenance data for data operations. Processing of such records, e.g., by the authentication engine 142, can increase efficiency of determining authenticity, can increase accuracy of such determinations, or a combination of both.

The authentication engine 142 uses the provenance data 144 to determine whether the retrieved backup data 122 is likely authentic. In contrast to a hash that the authentication system 104 uses to determine whether data was changed while stored in the archive database 114, the authentication system 104 uses the provenance data 144 to determine an authenticity of the data. As a result, the authentication system 104 can use both a hash and provenance data to verify different aspects of the retrieved backup data 122. In some cases, the provenance data 144 includes one or more cryptographic hashes of data. For example, hashes can be used by the verification engine 128 and by the authentication engine 142. Cryptographic hashes can be generated by the authentication system 104 to indicate, e.g., operations performed on archival data, such as the retrieved backup data 122.

The provenance data shown in FIG. 1 as being processed by the authentication engine 142 can be but a portion of all the provenance data used to verify the authenticity of the retrieved backup data 122. For example, provenance data can include hash comparison provenance data or verification provenance data, as discussed in this specification, or other provenance data.

The authentication engine 142 can check the provenance data, including links 143, for errors. For instance, the authentication engine 142 determines whether the retrieved backup data 122 is likely authentic using the provenance data 144 that was generated for at least some of the data included in the retrieved backup data 122. When the authentication engine 14 detects one or more errors in the provenance data 144 that indicate that the archival backup data 112 might not be authentic. The hash engine 127 can use hashes of data to verify the integrity of data, e.g., that the retrieved backup data 122 is likely the same data as the archival backup data 112 that was stored in the database. The authentication engine 142, in contrast, processes provenance data to determine authenticity, such as whether or not the data came from the right source or included one or more processes after being retrieved.

In some implementations, the authentication engine 142 determines whether one or more, e.g., each, expected operations performed for backup data are recorded in the provenance data 144. For example, the authentication engine 142 can determine that provenance data for generation of two hash values and storage of the data itself in a database are required for backup data to be authentic. The authentication engine 142 can have a list of expected operations or use any other appropriate data to determine whether provenance data indicates that one or more expected operations were performed for backup data.

In some implementations, the authentication engine 142 is configured to process the provenance data 144 to detect gaps or loops, e.g., by processing the provenance data 144 and the links 143. For example, the authentication engine 142 can determine a gap exists if the provenance data 144 includes an indication of an operation being performed without an indication of a prerequisite operation being performed—e.g., an indication of a second hash being generated but no indication of a first hash being generated or retrieved. The authentication engine 142 can determine a loop exists if the provenance data 144 includes one or more self-references, e.g., when both the source and destination of an operation are the same but these values should be different. For example, self-references can include one or more circular references in provenance data.

Provenance data may form a chain, e.g., including the first provenance data 116 prior to the second provenance data 126, indicating operations performed on, or information describing, data. Errors detected by the authentication engine 142 that indicate data is not authentic can include incorrect output being referenced. For example, a provenance chain can include a process referencing an incorrect output object, e.g., output of a process incorrectly linked to an input object, or output of a process incorrectly linked to some object other than an actual output. For instance, if a retrieval process, e.g., the archive engine 110 retrieving the retrieved backup data 122, produces an output in the second provenance data 126 but the provenance details incorrectly links this output to an original backup, e.g., the archival backup data 112, the authentication engine 142 can detect this as an error.

In some implementations, the authentication engine 142 determines an authenticity score using the provenance data 144. The authenticity score can represent a degree to which the retrieved backup data 122 is likely authentic. The authentication engine 142 can determine that the retrieved backup data 122 is likely authentic when the authenticity score satisfies an authenticity threshold.

The action engine 146 can perform one or more actions in response to receipt of output data from the authentication engine 142. For example, in response to the authentication engine 142 indicating that the retrieved backup data 122 is likely authentic, the action engine 146 can restore, from the archival backup data 112, one or more portions of the current data 134. The one or more portions of the current data 134 restored can correspond to data differences, between the archival backup data 112 and the current data 134, detected by the comparison engine 132. In some implementations, the action engine 146 generates one or more notifications for a user. For example, the action engine 146 can notify a user that one or more portions of data are being restored.

In some implementations, the action engine 146 generates and presents an interface to a user. For example, the interface can allow a user to select one or more differences, e.g., detected by the comparison engine 132, to be restored. In response to obtaining input from a user indicating one or more portions of data to be restored, the action engine 146 can restore the one or more portions of data, e.g., data of the current data 134, using archival data, e.g., the archival backup data 112.

In some implementations, restoring includes copying data from archival data and moving that copied data to overwrite one or more portions of current data. For example, the action engine 146 can copy data from the retrieved backup data 122 and modify the current data 134 to include one or more portions of the retrieved backup data 122.

In response to the authentication engine 142 indicating that the retrieved backup data 122 is not likely authentic or the retrieved backup data 122 does not have integrity based on a result of the hash engine 127 processing, the authentication system 104 can repeat processes discussed in reference to FIG. 1, e.g., until retrieved data from the archive is determined to be authentic and have integrity, until all portions to be restored have been restored, or a combination of both.

In some implementations, the comparison engine 132 performs granular comparisons, e.g., between selected backups or between a backup and current data 134. For example, the comparison engine 132 can perform discrepancy identification by comparing one or more backups—e.g., backups stored in the archive database 114. In some cases, the comparison engine 132 can obtain a first and second backup—e.g., one backup that has been authenticated and one that has not been authenticated—and compare the backups, e.g., to determine an authenticity of the non-authenticated backup. The comparison engine 132 can perform this analysis at any appropriate time. In some examples, the comparison engine 132 can perform this analysis after an authenticity of one or more backups is determined, e.g., by the authentication engine 142, or at least partially concurrently with an authenticity determination.

In some implementations, the comparison engine 132 applies one or more consistency analysis algorithms to determine differences and discrepancies, e.g., between one or more of identifiers, timestamps, content details, or metadata. For example, using a first and second backup or a first backup and the current data 134, the comparison engine 132 can apply one or more consistency analysis algorithms to determine differences and discrepancies between the first and second backup, as described in more detail below.

In some implementations, the comparison engine 132 performs exception handling. For example, the comparison engine 132 can trigger exception programming when the comparison engine 132 identifies one or more discrepancies between data sources, such as backups or current data. Exception handling can include alerting a user or correcting a backup or current data identified to be non-authentic. Exception handling can include identifying an authentic backup to be used instead of a backup identified as non-authentic based on discrepancies from an authentic backup or no discrepancies from a non-authentic backup.

In some implementations, the comparison engine 132 identifies modifications between two data sources, including data added, deleted, or altered. For example, the comparison engine 132 can identify modifications between first and second backup data stored in the archive database 114, between first backup data stored in the archive database 114 and the current data 134 from the database 102. In some implementations, the comparison engine 132 performs high-level and, optionally, lower-level comparisons. For example, the comparison engine 132 can start comparing data at a high-level—e.g., identifying discrepancies in an amount of data included in two or more data sources, discrepancies in a number of elements, or discrepancies in one or more identifiers. In response to identifying one or more discrepancies between two or more data sources, such as backups from the archive database 114, the comparison engine 132 can perform more precise content comparison—e.g., to identify lower-level modifications. Lower-level comparison can include identifying data that has been copied within a data source.

In some implementations, the authentication system 104 can use data from the comparison engine 132 to determine an authenticity of data for which the authentication system 104 does not have provenance data. For instance, the comparison engine 132 can determine whether there are one or more changes, such as account changes, in data between two data sources, such as first backup data and the current data. For example, the comparison engine 132 can determine whether there are one or more of schema modifications, inconsistencies of timestamps, or identifiers between the two data sources. In response to the comparison engine 132 not detecting a threshold number of discrepancies—e.g., one, the comparison engine 132 or another component of the authentication system 104 can determine that the provenance data for the first backup data can be used to indicate or otherwise determine the authenticity of the current data. The authentication system 104 can generate third provenance data 140 that indicates a threshold number of discrepancies was not detected. In general, the comparison engine 132 can include data in the third provenance data 140 that indicates a number of discrepancies detected by the comparison engine 132 in comparing data sources. The third provenance data 140 can indicate detailed information about any discrepancies, e.g., whether they are high level or low level discrepancies, portions of the data to which the discrepancies apply, or a combination of both. The authentication engine 142 can use the data in the third provenance data 140 to determine whether the current data is likely authentic or non-authentic. In this way, authenticity of one or more backups can be used to determine authenticity of one or more other backups, the current data 134, or a combination of both.

In some examples, the authentication system 104 can use a comparison of data in two data sources to determine a likely authenticity of a portion of data from one of the two data sources. For instance, when a first directory in the current data 134 is being analyzed for potential use, the authentication system 104 can perform one or more of the above processes to determine a likely authenticity for just that directory, e.g., instead of the entire dataset included in the current data 134.

The authentication system 104 is an example of a system implemented as computer programs on one or more computers in one or more locations, in which the systems, components, and techniques described in this specification are implemented. One or more networks (not shown), such as a local area network ("LAN"), wide area network ("WAN"), the Internet, or a combination thereof, can connects the authentication system 104 with the database 102, the archive database 114, devices 106a-b, or a combination of these. The devices can include personal computers, mobile communication devices, and other devices that can send and receive data over the one or more networks. The authentication system 104 can use a single computer or multiple computers operating in conjunction with one another, including, for example, a set of remote computers deployed as a cloud computing service.

The authentication system 104 can include several different functional components, including, e.g., the archive engine 110, the hash engine 127, the verification engine 128, the comparison engine 132, the authentication engine 142, the action engine 146, or a combination of these. Functional components can include one or more data processing apparatuses, can be implemented in code, or a combination of both. For instance, each of the archive engine 110, the hash engine 127, the verification engine 128, the comparison engine 132, the authentication engine 142, the action engine 146 can include one or more data processors and instructions that cause the one or more data processors to perform the operations discussed herein.

The various functional components of the authentication system 104 can be installed on one or more computers as separate functional components or as different modules of a same functional component. For example, components including one or more of the archive engine 110, the hash engine 127, the verification engine 128, the comparison engine 132, the authentication engine 142, or the action engine 146 of the authentication system 104 can be implemented as computer programs installed on one or more computers in one or more locations that are coupled to each through a network. In cloud-based systems for example, these components can be implemented by individual computing nodes of a distributed computing system.

Figure 2:
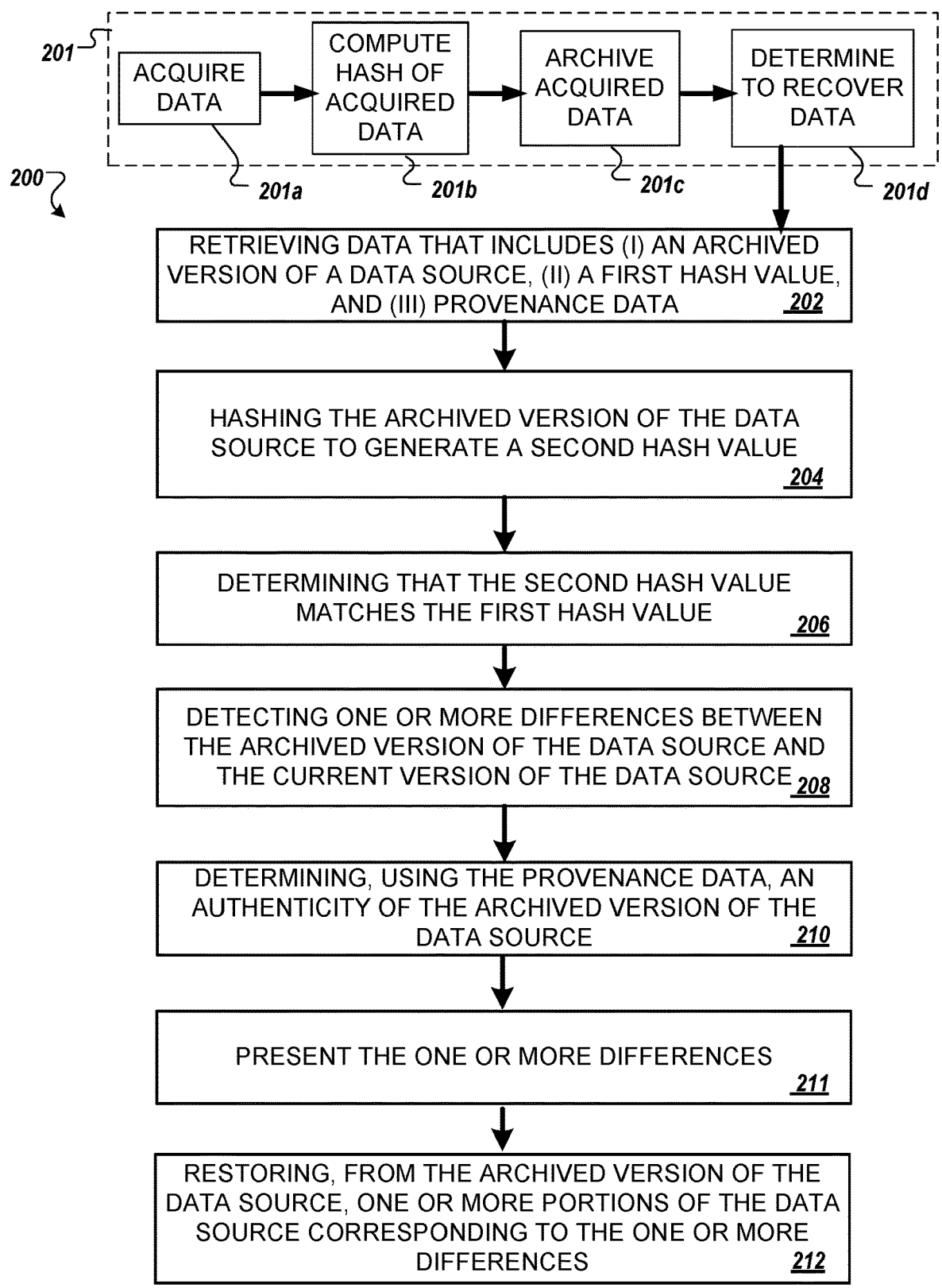
FIG. 2 is a flow diagram of an example process of data authentication validation.

FIG. 2 is a flow diagram of an example process of data authentication validation. For example, the process 200 can be used by the authentication system 104 from the environment 100.

The process 200 includes one or more optional steps 201, including acquiring data (201a), computing a hash of acquired data (201b), archiving acquired data (201c), and determining to recover data (201d). For example, the authentication system 104 can acquire the data copy 108 as part of step 201a. The authentication system 104 can compute the archival hash 118 of the data copy 108 using the hash engine 127 as part of step 201b. The authentication system 104 can archive the data copy 108 in the archive database 114 as part of step 201c. The authentication system 104 can determine to recover data, e.g., using the data copy 108 prior to performing one or more processes described in reference to FIG. 1, where the one or more processes can include retrieving the retrieved backup data 122.

The process 200 includes retrieving data that includes (i) an archived version of a data source, (ii) a first hash value, and (iii) provenance data (202). For example, the authentication system 104 can obtain the retrieved backup data 122, the retrieved hash 124, and the second provenance data 126 from the archive database 114.

The process 200 includes hashing the archived version of the data source to generate a second hash value (204). For example, the hash engine 127 can generate a recomputed hash using the retrieved backup data 122.

The process 200 includes determining that the second hash value matches the first hash value (206). For example, the verification engine 128 can compare the retrieved hash 124 and the recomputed hash and determine, based on comparing them, that the retrieved hash 124 and the recomputed hash match, e.g., have identical values or are sufficiently similar.

The process 200 includes detecting one or more differences between the archived version of the data source and the current version of the data source (208). For example, the comparison engine 132 can compare the retrieved backup data 122 and the current data 134.

The process 200 includes determining, using the provenance data, an authenticity of the archived version of the data source (210). For example, the authentication engine 142 can determine an authenticity score using provenance data 144 of the retrieved backup data 122 and determine that such a score satisfies a threshold.

The process 200 includes presenting the one or more differences (211). For example, the authentication system 104 can present one or more differences determined by the comparison engine 132 to a user or device. The authentication system 104 can present one or more differences in a user interface that allows a user to select one or more differences to be restored, e.g., using the retrieved backup data 122.

The process 200 includes restoring, from the archived version of the data source, one or more portions of the data source corresponding to the one or more differences (212). For example, the action engine 146 can restore one or more portions of the current data 134 using the retrieved backup data 122.

In some implementations, the generated copy is stored in a forensic format to support third party integrity verification and forensic examination. For example, the authentication system 104 can generate and export an audit trail for legal or compliance purposes that includes one or more items of the provenance data generated by the authentication system 104. Generating and exporting the audit trail for each part of the process, e.g., as described in reference to FIG. 1, can help support automated assurance of authenticity and integrity of recovered or repaired data, e.g., data recovered using the retrieved backup data 122. In some implementations, recovery data or the generated copy is displayed on a user device.

In some implementations, the process 200 includes determining that data is likely corrupted. For example, the authentication system 104 can use any appropriate process to determine that a portion of a data source is likely corrupted or has been lost. Processes can include checksums, error correcting codes (ECC), data cleansing, or a combination of these.

The order of operations in the process 200 described above is illustrative only and can be performed in different orders. For example, the process 200 can include determining an authenticity of the archived version of the data source prior to detecting one or more differences between the archived version of the data source and the current version of the data source.

In some implementations, the process 200 can include additional operations, fewer operations, or some of the operations can be divided into multiple operations. For example, the process 200 can be performed without performing the optional steps 201. Other steps of the process 200 can be optional. For example, the process 200 can include only steps 202 through 210 and 212 and not step 211. The process 200 can include only 208, 210, 212.

In this specification the term "engine" refers broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

In this specification, the term "database" is used broadly to refer to any collection of data: the data does not need to be structured in any particular way, or structured at all, and it can be stored on storage devices in one or more locations.

A number of implementations have been described. Nevertheless, it will be understood that various modifications may be made without departing from the spirit and scope of the disclosure. For example, various forms of the flows shown above may be used, with operations re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., a Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular implementations of the invention have been described. Other implementations are within the scope of the following claims. For example, the operations recited in the claims, described in the specification, or depicted in the figures can be performed in a different order and still achieve desirable results. In some cases, multitasking and parallel processing may be advantageous.

What is claimed is:

1. A method comprising:
   retrieving, from an archival database, data that includes (i) an archived version of a data source, (ii) a first hash value, and (iii) a set of provenance data for the archived version of the data source;
   hashing the archived version of the data source to generate a second hash value;
   determining that the second hash value and the first hash value satisfy a similarity criterion;

detecting one or more differences between archived data in the archived version of the data source and current data in a current version of the data source;

determining, using the set of provenance data for the archived version of the data source, whether the archived version of the data source is likely authentic; and in response to determining that the second hash value and the first hash value satisfy the similarity criterion and that the archived version of the data source is likely authentic using the set of provenance data, restoring, from the archived version of the data source, one or more portions of the data source corresponding to some of the one or more differences.

2. The method of claim 1, wherein the provenance data represents one or more of (i) a source of the archived version of the data source, (ii) an operation performed on the archived version of the data source, (iii) a tool used to perform the operation on the archived version of the data source, or (iv) an indication of a result of the operation.

3. The method of claim 2, wherein determining, using the set of provenance data, whether the archived version of the data source is likely authentic comprises:

comparing an expected number of operations and results with a number of operations and results represented in the provenance data.

4. The method of claim 2, wherein determining, using the set of provenance data, whether the archived version of the data source is likely authentic comprises:

comparing an expected result of one or more operations with one or more results represented in the provenance data.

5. The method of claim 4, wherein the expected result of one or more operations is a result indicating operation success of the one or more operations, wherein the one or more operations are performed on the archived version of the data source.

6. The method of claim 1, wherein restoring the one or more portions of the data source comprises:

restoring one or more data objects used to detect the one or more differences between archived data in the archived version of the data source and current data in the current version of the data source.

7. The method of claim 1, comprising:

determining that a portion of the current version of the data source is likely corrupted or has been lost, wherein:

retrieving the archived version and detecting the one or more differences between the archived data in the archived version of the data source and the current data in the current version of the data source are responsive to determining that the portion of the current version of the data source is likely corrupted or has been lost.

8. A system comprising one or more computers and one or more storage devices on which are stored instructions that are operable, when executed by the one or more computers, to cause the one or more computers to perform operations comprising:

retrieving, from an archival database, data that includes (i) an archived version of a data source, (ii) a first hash value, and (iii) a set of provenance data for the archived version of the data source;

hashing the archived version of the data source to generate a second hash value;

determining that the second hash value and the first hash value satisfy a similarity criterion;

detecting one or more differences between archived data in the archived version of the data source and current data in a current version of the data source;

determining, using the set of provenance data for the archived version of the data source, whether the archived version of the data source is likely authentic; and in response to determining that the second hash value and the first hash value satisfy the similarity criterion and that the archived version of the data source is likely authentic using the set of provenance data, restoring, from the archived version of the data source, one or more portions of the data source corresponding to some of the one or more differences.

9. The system of claim 8, wherein the provenance data represents one or more of (i) a source of the archived version of the data source, (ii) an operation performed on the archived version of the data source, (iii) a tool used to perform the operation on the archived version of the data source, or (iv) an indication of a result of the operation.

10. The system of claim 9, wherein determining, using the set of provenance data, whether the archived version of the data source is likely authentic comprises:

comparing an expected number of operations and results with a number of operations and results represented in the provenance data.

11. The system of claim 9, wherein determining, using the set of provenance data, whether the archived version of the data source is likely authentic comprises:

comparing an expected result of one or more operations with one or more results represented in the provenance data.

12. The system of claim 11, wherein the expected result of one or more operations is a result indicating operation success of the one or more operations, wherein the one or more operations are performed on the archived version of the data source.

13. The system of claim 8, wherein restoring the one or more portions of the data source comprises:

restoring one or more data objects used to detect the one or more differences between archived data in the archived version of the data source and current data in the current version of the data source.

14. The system of claim 8, wherein the operations comprise:

determining that a portion of the current version of the data source is likely corrupted or has been lost, wherein:

retrieving the archived version and detecting the one or more differences between the archived data in the archived version of the data source and the current data in the current version of the data source are responsive to determining that the portion of the current version of the data source is likely corrupted or has been lost.

15. One or more computer storage media encoded with instructions that, when executed by one or more computers, cause the one or more computers to perform operations comprising:

retrieving, from an archival database, data that includes (i) an archived version of a data source, (ii) a first hash value, and (iii) a set of provenance data for the archived version of the data source;

hashing the archived version of the data source to generate a second hash value;

determining that the second hash value and the first hash value satisfy a similarity criterion;

detecting one or more differences between archived data in the archived version of the data source and current data in a current version of the data source;

determining, using the set of provenance data for the archived version of the data source, whether the archived version of the data source is likely authentic; and in response to determining that the second hash value and the first hash value satisfy the similarity criterion and that the archived version of the data source is likely authentic using the set of provenance data, restoring, from the archived version of the data source, one or more portions of the data source corresponding to some of the one or more differences.

16. The storage media of claim 15, wherein the provenance data represents one or more of (i) a source of the archived version of the data source, (ii) an operation performed on the archived version of the data source, (iii) a tool used to perform the operation on the archived version of the data source, or (iv) an indication of a result of the operation.

17. The storage media of claim 16, wherein determining, using the set of provenance data, whether the archived version of the data source is likely authentic comprises:

comparing an expected number of operations and results with a number of operations and results represented in the provenance data.

18. The storage media of claim 16, wherein determining, using the set of provenance data, whether the archived version of the data source is likely authentic comprises:

comparing an expected result of one or more operations with one or more results represented in the provenance data.

19. The storage media of claim 18, wherein the expected result of one or more operations is a result indicating operation success of the one or more operations, wherein the one or more operations are performed on the archived version of the data source.

20. The storage media of claim 15, wherein restoring the one or more portions of the data source comprises:

restoring one or more data objects used to detect the one or more differences between archived data in the archived version of the data source and current data in the current version of the data source.

* * * * *